United States Patent [19]

Georgiou

[11] Patent Number: 4,630,045
[45] Date of Patent: Dec. 16, 1986

[54] CONTROLLER FOR A CROSS-POINT SWITCHING MATRIX

[75] Inventor: Christos J. Georgiou, White Plains, N.Y.

[73] Assignee: International Business Machines Corporation, Armonk, N.Y.

[21] Appl. No.: 544,653

[22] Filed: Oct. 24, 1983

[51] Int. Cl.[4] .............................................. H04Q 9/00
[52] U.S. Cl. ............................. 340/825.79; 340/825.8; 379/284
[58] Field of Search ................... 340/825.79, 825.83, 340/825.89, 825.8; 179/18 ES, 18 GF; 375/3

[56] References Cited

U.S. PATENT DOCUMENTS

| | | | |
|---|---|---|---|
| 3,935,394 | 1/1976 | Bulfer. | |
| 4,023,141 | 5/1977 | Hwang | 340/825.8 |
| 4,119,805 | 10/1978 | Patrelli | 179/18 FC |
| 4,162,535 | 7/1979 | Anderson | 179/18 GF |
| 4,196,316 | 4/1980 | McEowen | 179/18 ES |
| 4,229,624 | 10/1980 | Haben | 179/18.005 |
| 4,256,925 | 3/1981 | Goode | 375/3 |
| 4,331,956 | 5/1982 | Anderson | 340/825.89 |
| 4,393,381 | 7/1983 | Seiden | 340/825.83 |
| 4,412,102 | 10/1983 | Ogawa et al. | 179/18 GF |
| 4,440,986 | 4/1984 | Thorson | 179/18 ES |

Primary Examiner—Donald J. Yusko
Attorney, Agent, or Firm—Sughrue, Mion, Zinn, Macpeak, and Seas

[57] ABSTRACT

A controller for controlling a one-sided switching matrix comprising a plurality of circuit elements under the control of logic circuitry. The controller interprets a request for connection or disconnection, determines if it is possible, selects a path through the matrix and sends control signals to the matrix. The circuit elements are arranged in a parallel/pipeline architecture with multiple circuit elements simultaneously operating on a request. The controller can fetch a second request while executing a first request. The result of a request is to connect or disconnect interconnection paths on the switching matrix.

10 Claims, 4 Drawing Figures

CONTROLLER FOR A CROSS-POINT SWITCHING MATRIX

BACKGROUND OF THE INVENTION

1. Technical Field

This invention relates generally to controllers for cross-point switches and, in particular, to electronic controllers for high-speed switching.

2. Prior Art

Cross-point switches have found wide use in communications systems, particularly in the telephone industry. Shown in FIG. 1 is a simple one-sided cross-point switching matrix which switches four data lines 10, 12, 14 and 16. These data lines are connected through terminals to internal row lines 18, 20, 22 and 24 of the switch. In a semiconductor cross-point switching matrix, these internal lines are conducting paths. The switching matrix also has internal column lines 26 and 28 which cross the rows without touching or contacting them. However, at each intersection of a row and column is placed a bi-directional switch or cross-point, for instance cross-point 30 at the intersection of row 10 and column 26. Each cross-point serves to connect a row to a column. In the simplest case of a one-sided switch, the columns 26 and 28 are not connected outside the switch but serve only as internal conduction paths. All data enters and leaves the switch on the data lines 10–16. To accomplish this connection, cross-points need to be turned on. For example, if lines 10 and 14 are to be interconnected, then both cross-points 30 and 32 can be turned on, with column 26 serving as the internal connection. It can be readily seen however that the same interconnection can be made by turning on switches 34 and 36 which use column 28 as the internal connecting line. The cross-points are all controlled by a controller 38 which is connected to the switch by a control bus 40.

Many types of controllers have been described which may be used with the cross-point switching matrix of FIG. 1. With the advent of semiconductor cross-point switches and the popularity of electronic switching systems, many of the recent controller designs have been implemented in integrated circuits, or a programmable computer has functioned as the controller. Examples of computerized switch controllers are given by Anderson in U.S. Pat. No. 4,331,956, by Bulfer in U.S. Pat. No. 3,935,394, and by McEowen et al. in U.S. Pat. No. 4,196,316. However, almost all of these electronic switching networks have been designed for communication systems in which the switching can occur at a fairly leisurely pace because, once the interconnections have been established, the data lines remain connected to each other for substantial periods of time. However, in the case where the cross-point switch is to be used within a computer or other computerized system and the interconnections are generally short-lived, a controller which requires a long time to establish the interconnections will severely reduce the effective bandwidth of the cross-point switch. Alternately stated, from the time a data line interconnection is requested until it is accomplished, no data can flow through the cross-point switch, and, accordingly, the throughput of the associated computer is reduced. Although a computerized controller will operate relatively fast, it requires a number of machine cycles to effect the connection after the service request has been made and suffers a corresponding delay. This delay is particularly significant for a one-sided switch, such as that shown in FIG. 1, because of the multiplicity of possible connection paths, i.e., a column not presently in use must be chosen.

SUMMARY OF THE INVENTION

Accordingly, it is an object of this invention to provide an electronic controller for a cross-point switch with minimum delay.

It is a further object of this invention to provide a controller that can simultaneously process multiple service requests.

The invention may be briefly summarized as a controller for a cross-point switch comprising a plurality of electronic elements arranged in a parallel/pipeline architecture. The pipeline characteristic allows one step of a first request to be serviced simultaneously with another step of a second request. The parallel characteristic within segments of the pipeline allow several sub-steps of a step to be performed concurrently, thereby reducing the delay in servicing the request.

DETAILED DESCRIPTION OF THE PREFERRED EMBODIMENT

Figure 1:
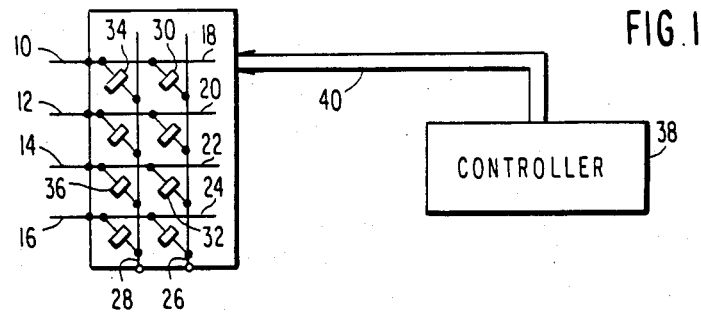
FIG. 1 is a schematic representation of a prior art one-sided cross-point switch and its controller.
Figure 2:
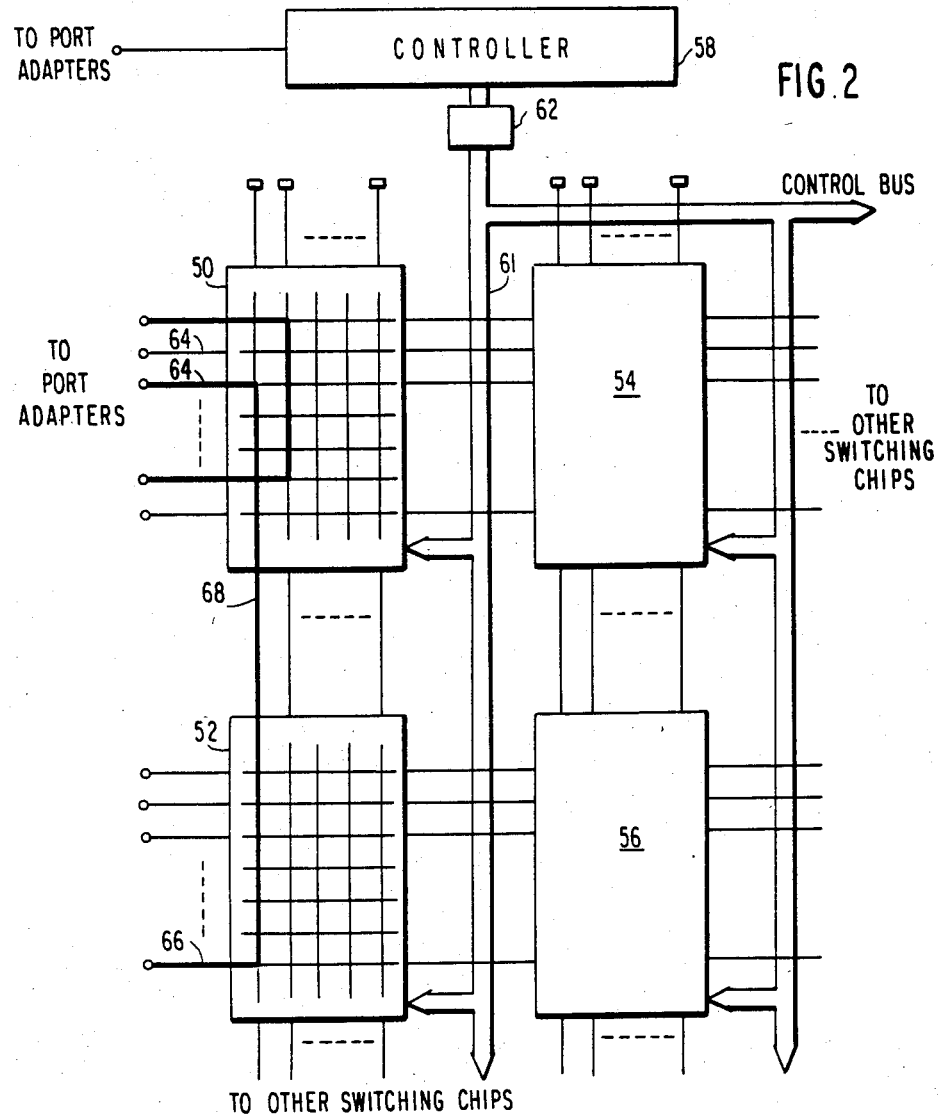
FIG. 2 is a schematic representation of an array of cross-point switching matrices and their controller.

Patent application Ser. No. 544,652, filed concurrently on Nov. 24, 1983 by this inventor and entitled "Array of Cross-point Switching Matrices", discloses a cross-point switching system, as illustrated in FIG. 2. In this copending application, rather than a single cross-point switching matrix, there is provided an array of cross-point switching matrices 50, 52, 54 and 56 which are arranged in a rectangular pattern. The array not only allows the use of smaller sized switching matrices in a larger cross-point switching system but also can be designed to be fault-tolerant if one of the matrices fails. Data lines enter the matrices from the left, with the number of matrices arranged vertically depending upon the number of data lines. A controller 58 controls the setting of the cross-points through a control bus 60. Controllers for one-sided switches have been described by Hwang in U.S. Pat. No. 4,023,141. A separate marker 62 composed of decoders, selectors and latches may be provided between the controller 58 and the control bus 61 for relieving the controller of routine tasks, such as latching and matrix enabling. Such markers as used with cross-point controllers are described by Pratelli in U.S. Pat. No. 4,119,805. The data lines are connected to the horizontal rows within a switching matrix at a terminal which may include a tri-state buffer. If the two data lines to be interconnected are connected to a common switching matrix such as matrix 50, then the switching can be performed similarly to that shown in FIG. 1. However, if the two data lines are on different rows of the array, for example data lines 64 and 66, then the matrices 50 and 52 may be operated as two-sided switching matrices. The two matrices 50 and 52 each have vertical columns connected through terminals to a vertical interconnection line 68 which completes the circuit. Of course, cross-points on both arrays 50 and 52 need to be set for such an interconnection.

Additional columns of switching matrices 54 and 56 are included for two reasons. First, the additional vertical interconnection lines may be required to provide complete connectivity between rows so that a requested connection is never blocked by previously requested connections. A system is said to have full connectivity or to be non-blocking if allowable connections can always be made. Secondly, it is obvious from FIG. 2 that any available vertical line, whether a vertical line within a switching matrix or the vertical interconnecting lines between the matrices, may be used for an interconnection. Therefore, if switching matrix 50 fails, it is possible to use matrix 54 to perform the switching. Of course, if the switching system is to remain non-blocking with one or more of the switching matrices having failed, it is necessary to provide additional columns of switching matrices beyond those required for full connectivity in the unfailed state.

The controller 58 in FIG. 2 receives the information necessary to complete the interconnection from the same data line that is to be switched. This information includes at least what data line is requesting connection and to which data line the connection should be made. Therefore, port adapters receive the data lines entering the switching system, recognize when a request is being made, and direct that request to the controller 58. If a service request is not being made, the external data lines direct the incoming data to the respective switching array or, alternatively, direct data from the switching array onto the external data lines.

Figure 3:
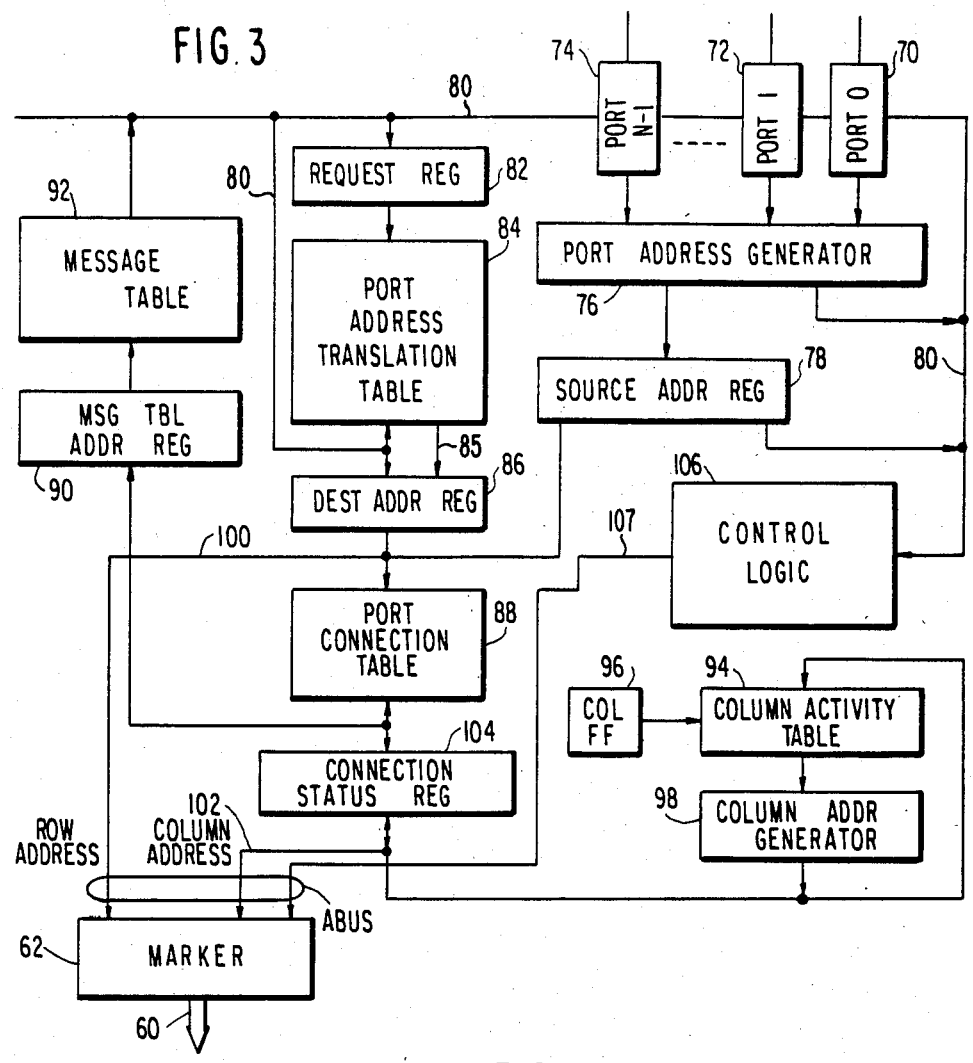
FIG. 3 is a block diagram of an embodiment of the controller of this invention.

An embodiment of the controller of the present invention is shown in block diagram form in FIG. 3. The external data lines are connected to the N ports 70, 72 and 74 which are capable of recognizing when these lines carry a service request. Not shown are the connections between the external lines or the ports 70, 72 and 74 to the data inputs of the switching matrices. These ports may include latches so that, if a service request cannot be immediately performed, the request is held pending service. Each of the ports 70, 72 and 74 is connected by a service requesting line to a port address generator 76 which outputs the address of the port making the request. The port address generator 76 also serves to arbitrate which port is to be serviced if more than one port is requesting service. The address of the selected port is fed to a source address register 78. The port so selected writes its service request onto an internal control data bus 80, and this request is then written into a request register 82. The service request contains at least two types of information, whether it is a request for connection or disconnection and what destination port is involved for a connection. A port address translation table 84 provides a translation between a logical and a physical address for a destination port. This additional flexibility allows devices to be rearranged on the external lines without the need of updating destination addresses in all the other devices. The physical address of the destination, i.e. the number of the port to which connection is to be made, is read from the port address translational table 84 across a connecting line 85 into a destination address register 86.

The array of cross-point switching matrices as shown in FIG. 2 acts as a one-sided cross-point switch. As a result, a column needs to be selected to connect the requesting row to the requested row. The choice of the column is somewhat arbitrary, but it must avoid columns which are presently being used for other interconnections. Furthermore, in the case of a fault tolerant system, those columns must be avoided which for one reason or another have failed.

Just because a destination port has been requested, it is not necessary that the port is available. It may already be connected, either as a requesting line or a requested line, and in this embodiment only two external lines are connected together at once. Therefore, a port connection table 88 is used to record which ports are presently busy. The port connection table 88 is set up as a multiword memory in which the addresses correspond to the ports. At each address is stored, at a minimum, an indication as to whether that port is busy. As will be described later for the present embodiment, the port connection table 88 also contains the information as to which column is being used for a busy port. Therefore, the location within the port connection table 88 that is addressed by the destination register 86 contains an indication as to whether the requested port or destination is available. This port availability information is loaded into a message table address register 90 which addresses a message table 92 connected via the internal control data bus 80 to the ports 70, 72 and 74. If the request was unsuccessful because the requested port is unavailable, then a message is transmitted back through the requesting port to the requesting device on the external line.

The information as to what columns are available to complete the interconnection is contained in the column activity table 94, which is a register having a number of bits equal to the number of columns in the system. If a bit in the column activity table 94 is set to 1, that column is denoted as being busy. A column flip/flop 96 contains a 1 when a connection is being requested and a 0 when a disconnection is requested. A column address generator 98 determines from the column activity table 94 which of the columns are available and selects one of them for interconnection. It then causes a 1 to be read into the column activity table 94 at the bit position corresponding to the selected column. The column address generator 98 may simply select the first available column or it may perform more intelligent allocation dependent upon system considerations not mentioned here. The column activity table 94 can also be used to prevent a failed column from being subsequently used by ensuring that each failed column is marked with a 1 upon detection of its failure.

At this point, all the required information to perform cross-point switching is available. The source address is available from the source address register 78, the destination address is available from the destination address register 86, and the column being used is available from the column address generator 98. These data are directed to the row address control line 100 and the column address bus 102. These two buses 101 and 102 form part of the control bus or A bus leading to the marker 62, shown in FIG. 2, that directly controls the cross-point switching matrices.

A refinement for the controller of FIG. 3 has the port connection table 88 not only indicating which ports are being used but also to which column each port is connected. This refinement is accomplished by transferring the output of the column address generator 98, which denotes the column to be used for the interconnection, into a connection status register 104. Then the value of the connection status register 104 is used to fill the two locations in the port connection table 88 addressed by the source address register 78 and the destination address register 86.

It is to be appreciated that a control logic 106 is required to time all these operations and to direct the flow of data. Separate control lines, not shown, interconnect the control logic 106 to all the circuit elements of FIG. 3. The control logic 106 provides timed control pulses to each of the circuit elements to enable them to either receive data or to transmit data on other lines at the proper times as described later for the flow of information in the controller. A clock provides a timing signal to the control logic 106 determining the execution rate of the controller. The control logic 106 may be implemented as a counter driven by the clock and the counter controls a read-only memory (ROM) which has the proper control signals for each time period. However, jumps are sometimes required in the execution sequence so that the counter needs to reflect the different sequences. Alternatively, a programmable logic array (PLA) could be used which, for each count of the clock, generates the proper control signals and the address for the next count based also on data fed to the control logic 106 from the circuit elements. In yet another embodiment, the control logic 106 could be a programmed microprocessor outputting parallel control signals. Such microprocessor control circuits are well known in the art. Outputs on a controller bus 107 of the control logic 106 are also used for part of the control bus or A bus carried to the marker 62.

There are at least two different types of service requests: a request for connection and a request for disconnection. The request for connection is further divided into the cases where the destination is available and where the destination is unavailable. The control logic 106 will control the operation of the controller in these three distinct cases. The controller will operate upon the request in three steps or phases. In the first phase a request is fetched from a port and the request is processed to determine what is to be done and if it can be done. In this embodiment of the invention, the request fetch is the same for all three types of service requests. In the next phase the request is executed. The operation of this phase will of course depend upon what type of request has been made. The control logic 106 has received the request over the internal control bus 80 when the request was written into the request register 82 or alternatively can read the request from over the internal control bus 80. If the request can successfully be completed, then there is a third phase in which the cross-points are marked. In FIG. 2, the marker is separated from the controller, but it is to be understood that both exercise control functions, and therefore the marker can be properly incorporated into the controller. The sequence of operations for the three types of service requests will now be described. These operations will be carried out in the separate circuitry indicated in FIG. 3 but under the control of the control logic 106.

The operations for a connection request when the destination is available are shown in Table 1 where the instructions are acronyms corresponding to the elements of FIG. 2. In the first step of the first phase or of the request fetch, a new port address is generated by the port address generator 76 when it responds to a requesting line from one of the ports 70, 72 and 74. With the port address known, the contents of that port are transferred in a second step to the request register 82 over the internal control data bus 80.

TABLE 1
CONNECTION REQUEST - DESTINATION AVAILABLE

| I. REQUEST FETCH | |
|---|---|
| 1. PAG ← PORT | Generate New Port Address |
| 2. RR ← PORT(PAG) | Read Request Off Port |
| 3. DAR ← PATT(RR) | Translate Logical into Physical Address |
| 4. SAR ← PAG | Set Source Address Register |
| CSR ← PCT(DAR) | Find Destination Status |
| MTAR ← PCT(DAR) | Select Return Message |
| II. REQUEST EXECUTE | |
| 1. CSR ← CAG | Prepare to Update Connection Table |
| COL FF ← 1 | Prepare to Update Column Activity Table |
| 2. ABUS ← DAR | Place Destination Address on Bus |
| ABUS ← CAG | Place Column Address on Bus |
| PCT(DAR) ← CSR | Update Destination Connection Table Entry |
| CAT(CAG) ← COL FF | Update Column Activity Table |
| 3. ABUS ← SAR | Place Source Address on Bus |
| ABUS ← CAG | Place Column Address on Bus |
| PORT(SAR) ← MT(MTAR) | Place Return Message into Port |
| PCT(SAR) ← CSR | Update Source Connection Table Entry |
| 4. CAG ← CAT | Generate New Column Address |
| III. MARK CROSS-POINTS | |

The port address generator 76 determines which of the ports is to be connected to the bus. The information in the request register 82 is the request which contains both the type of request, whether for connect or disconnect, and for what destination port. In a third step, the port address translation table 84 translates the port address part of the request from a logical to a physical port. The usefulness of this translation can be explained in the context of a computer system where a processor attached to one of the ports desires to output some data to a printer. The processor would not need to know on which port the printer is located if this translation from logical to physical is provided by the port address translation table 84. Furthermore, the devices connected to the ports can be reconfigured with changes required only in the port address translation table 84 and not in all of the processors which might be requesting one of the reconfigured devices.

A fourth step in the request fetch is divided into three sub-steps, all of which are occurring or being processed simultaneously. In the first sub-step, the contents of the port address generator 76 are transferred to the source address register 78. The source address is the number of the port that has made the request. In the second sub-step, the status of the requested destination port is obtained from the port connection table 88. As mentioned previously, the port connection table 88 is a multi-word memory with each word or entry in the table corresponding to one of the ports. One of the bits in these words denotes whether that port is presently busy. Thus in this sub-step, the contents of the word whose address is determined by the destination address register 86 are read into the connection status register 104. Simultaneously, in the third sub-step, this same word is read into the message table address register 90. At this point, the information is available to the control logic 106 as to not only what type of service has been requested, as indicated in the request on the internal control bus 80, but also whether a requested connection can be made, as indicated in the connection status register 104. The word fed into the message table address register 90 is used to select a return message to be sent back through the requesting port to the requesting device. Because several requests may be awaiting service in the ports 70, 72 and 74, a return message is required to notify the requesting device that its request is being processed. Furthermore, if the device has requested an unavailable port, this information needs to be transmitted back to the requesting device so that it may proceed accordingly. In the above-described steps of the first phase of the request or the request fetch, intermediate information has been generated which determines the type of request, the physical port requested and whether the request can be honored.

In the second phase of a connection request, when it has been determined that the destination port is available, the request is executed as follows. A first step is divided into two parallel sub-steps. The contents of the column address generator which have previously been generated are written into the connection status register 104. This is done in preparation to updating the port connection table 88 with the information as to what column is going to be used for this interconnection. As will be described for the fourth step below, at the end of every request execution for a successful connection request or disconnection request, a new column address is generated for the column to be used for the subsequent connection request. Concurrently with the connection status register 104 being written into, as described above, the column flip/flop 96 is set to 1 which will be subsequently used to indicate that a column has been placed into service.

A second step of the execution for a successful connection request is divided into four concurrent sub-steps. The destination address is read from the destination address 86 onto the row address line 100 of the control bus which is designated as the A bus. The column address is also read from the column address generator 98 onto the column address line 102 of the A bus. Simultaneously, the port connection table 88 is updated by loading the contents of the connection status register 104, which are the column to be used for the new connection as well as a bit indicating connection, into the port connection table 88 at the location addressed by the destination address register 86. Therefore, the entry in the port connection table 88 for the destination port contains the number of the column that is used for this connection as well as the bit indicating that this port will be in use. Concurrently with the above three sub-steps, the 1 contained in the column flip/flop 96 is read into the column activity table 94 at the bit position that is addressed by the column address generator 98. That is to say, the bit in the column activity table 94 for the column that is to be used for this connection is set to 1, indicating that it will be in use.

A third step in the execution for a successful connection request is divided into four concurrently processed substeps. The source address for the requesting port is placed on the A bus by being read from the source address registers 78 onto the row address line 100. The column address is once again placed on the A bus by being read from the column address generator 98 onto the column address line 102. Thus, it is seen that the marker 62 must process the column and port addresses for the destination that were put on it in the preceding step, before it can accept the port and column address for the source port in this step. Concurrently, a return message to the requesting device is placed into its port by reading from the message table 92 the message that is addressed by the message address register 90 into the port that is addressed by the source address register 78, this message being transmitted over the internal control data bus 80. The last concurrent substep of this step is updating the port connection table 88 for source connection. The contents of the connection status register 104 (the column providing the connection), as well as the in-use bit, are read into the port connection table 88 at the location or entry addressed by the destination address register 86, whereby the port making the request is indicated to be in use and to be using a particular column for its interconnection.

In the final step of the execution of a successful connection request, a new column address is generated for a subsequent connection request. The contents of the column activity table 94 are read into the column address generator 98 which inspects the table to see which columns, not marked with 1, are available for use and also selects one of these entries for subsequent output as a column to be connected.

The marker 62 may be a separate unit, or it may be incorporated into the controller. Alternatively, there may be separate markers associated with each switching matrix of the matrix array of FIG. 2. The marker performs several routine functions. It decodes the addresses that it receives from the A bus and selects the corresponding switching matrix of the array. Based upon the column and row address for that array, it then sends the proper row and column address to the selected switching matrix. If the switching array is isolated by tri-state buffers, the marker turns on the buffers for the correct row or column. Finally, it turns on the proper cross-point, depending upon the row and column address or sends a command to the matrix to this effect. This control information may be latched on the switching matrix so that the cross-point remains enabled after the control signals on the bus 60 have been removed. The third step of a successful connection request involves marking the cross-points. The marking of the destination cross-point must be performed concurrently with the execution of the third step of the request execution because the A bus will be shortly used for the source addresses. In the following or fourth step, the cross-point for the source is marked.

In the situation where a connection is requested but the destination is unavailable, as shown in the sequence of operations in Table 2, the request fetch is performed exactly as described previously for a successful connection request. However, in the fourth step, the contents of the port connection table 88 which are loaded into the connection status register 104 will indicate that the requested connection is presently impossible because the requested port is presently busy. This information is detected by the control logic 106 which then executes the connection request with the destination being unavailable. The first two steps of this request execute are called "no-operations". This means that the time for two steps elapses but nothing is done. This delay is required for the pipeline processing which will be described later. In a third step, a message is returned to the originating device through the requesting port. This is accomplished by reading the message table 92, as addressed by the message table address register 90 onto the internal control data line bus 80 which is selectively connected to the port addressed by the source address register 78. This return message will indicate that the requested connection cannot be made. A fourth step of the request execution for an unsuccessful connection request is also a no-operation. Because no cross-points are set, there is no marking phase. The only real activity externally detected in an unsuccessful connection request is the return message.

TABLE 2

CONNECTION REQUEST - DESTINATION UNAVAILABLE

| I. REQUEST FETCH | |
| --- | --- |
| 1. PAG ← PORT | Generate New Port Address |
| 2. RR ← PORT(PAG) | Read Request Off Port |
| 3. DAR ← PATT(RR) | Translate Logical into Physical Address |
| 4. SAR ← PAG | Set Source Address Register |
| CSR ← PCT(DAR) | Find Destination Status |
| MTAR ← PCT(DAR) | Select Return Message |
| II. REQUEST EXECUTE | |
| 1. NOP | No Operation |
| 2. NOP | No Operation |
| 3. PORT(SAR) ← MT(MTAR) | Place Return Message into Port |
| 4. NOP | No Operation |

A controller for a cross-point switching system must not only be able to connect lines, it must also have the capability of disconnecting them. Therefore, one of the service requests will be for disconnection. The series of operations required for a disconnection request is shown in Table 3.

TABLE 3

| DISCONNECT REQUEST | |
| --- | --- |
| I. REQUEST FETCH | |
| 1. PAG ← PORT | Generate New Port Address |
| 2. RR ← PORT(PAG) | Read Request Off Port |
| 3. DAR ← PATT(RR) | Translate Logical into Physical Address |
| 4. SAR ← PAG | Set Source Address Register |
| CSR ← PCT(DAR) | Find Column Address |
| MTAR ← PCT(DAR) | Select Return Message |
| II. REQUEST EXECUTE | |
| 1. COL FF ← 0 | Prepare to Update Column Activity Table |
| 2. ABUS ← DAR | Place Destination Address on Bus |
| ABUS ← CSR | Place Column Address on Bus |
| PCT(DAR) ← 0 | Update Destination Connection Table Entry |
| CAT(CSR) ← COL FF | Update Column Activity Table |
| 3. ABUS ← SAR | Place Source |

TABLE 3-continued

| DISCONNECT REQUEST | |
| --- | --- |
| ABUS ← CSR | Address on Bus Place Column Address on Bus |
| PCT(SAR) ← 0 | Update Source Connection Table Entry |
| PORT(SAR) ← MT(MTAR) | Place Return Message into Port |
| 4. CAG ← CAT | Generate New Column Address |
| III. MARK CROSS-POINTS | |

The request fetch involved with the disconnection request is identical to the request fetch resultant from a connection request. If the internal control data line bus 80 is also connected to the control logic 106, the logic becomes aware, as early as the second step of the request fetch, that the request is for disconnection, rather than connection, and proceeds accordingly for the request execution.

In the first step of the request execute, the column flip/flop 96 is set to zero. This value will be subsequently used to inactivate the appropriate entry in the column activity table 94.

The second step of the disconnection request execute consists of four concurrently operating sub-steps. The destination address is placed on the A bus by reading the destination address register 86 onto the row address line 100. Also, the connection status register 104 containing the interconnecting column information stored in the port connection table 88 is read onto the column address line 102. Thus it is seen that by use of the interconnecting column information in the port connection table 88, it is not required that the device requesting this disconnection specify from which port it desires to be disconnected. The port connection table 88 is updated for its destination entry by writing a zero into the entry addressed by the destination address register 86. The last concurrent substep is the updating of the column activity table by transferring the zero in the column flip/flop 96 into the entry of the column activity table 94 as addressed by the connection status register 104. As a result, that column is hereafter denoted as available.

A third step of the execution of a disconnection request has four concurrently operating sub-steps. The source address is placed on the A bus by reading the contents of the source address register 78 onto the row address line 100. Also, the column address is placed on the A bus by reading the contents of the connection status register 104 onto the column address line 102. The port connection table 88 is updated for its source connection entry, by setting its location addressed by the source address register 78 to zero, indicating that the source is hereafter available. Finally, a message is placed onto the port, so that the requesting device may be notified, if necessary, of the impending action and the port electronics may be reset. This message is sent by outputting the message in the message table 92 addressed by the message table address register 90 to the port addressed by the source address register 78.

The fourth and final step of the execution for the disconnection request is the generation of a new column address which proceeds, just as for a successful connection request, by transferring the contents of the column activity table 94 into the column address generator 98.

The marker also has to operate in the disconnection request to de-select the appropriate switching matrices and columns and rows and to turn off the previously required tri-state buffers.

The sequences of operations shown in Tables 1, 2 and 3 have been carefully chosen to allow a parallel/pipeline operation for the controller. This operation will be explained with reference to FIG. 4 which shows timing diagrams for the phases of either a connect request or a disconnect request. Each phase is separated into four sequential steps. If the steps are operating at a step rate, the phase rate is one-quarter of the step rate. For a particular request, the execute phase follows the fetch phase because it relies upon information generated in the fetch phase. The mark phase is a little different. It consists of only two steps which operate during the last two steps of the corresponding execute phase. Each of its steps depends upon information generated in the immediately preceding step of the execute phase. The steps shown are sequentially executed, i.e., in the order indicated in FIG. 4, because they generally rely upon information generated in the immediately preceding step. However, many of the steps consist of several sub-steps, each of which may be executed simultaneously because the input of one of them does not depend upon the output of another. Thus if four sub-steps are operating simultaneously, this execution is performed four times faster than if the sub-steps were instead sequential steps. This provides the parallel characteristic of the operation of this processor and allows much faster response of the controller.

Figure 4:
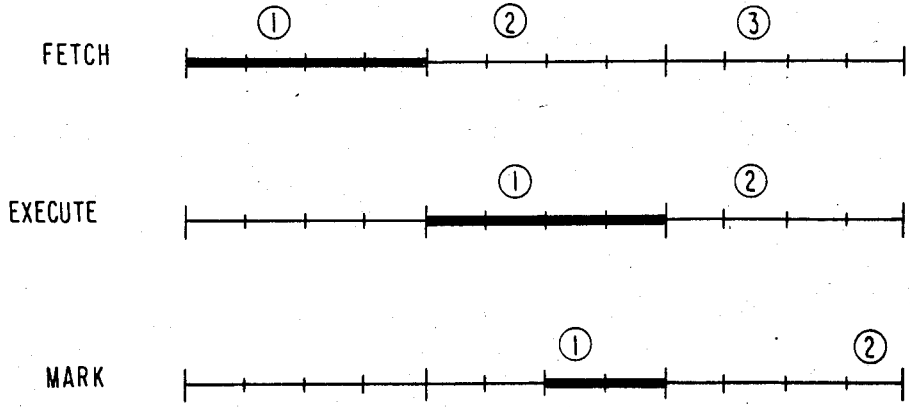
FIG. 4 is a timing diagram for the operation of the controller illustrating its pipeline operation.

A close inspection of the steps involved in the various phases of the different requests will indicate that different phases of two separate requests can be executed simultaneously without an inadvertent interchange of parameters between requests. For example, as shown in FIG. 4, once the fetch phase for a connection request has been completed, the execute phase of that same request begins. However, it is further possible for a fetch phase of a second request to begin as soon as the fetch phase of the first request ends. Likewise, the execute phase of the second request can immediately follow the execute phase of the first request. At this time also, a third request can be fetched. This simultaneous sequential processing of a multiple request is called "pipeline operation". The request moves down the pipeline from the fetch phase through the initial part of the execute phase into the mark phase. As it leaves the fetch phase, a subsequent request can take its place as it progresses onto the next phase. The pipeline operation provides not speed but throughput. More requests can be serviced in a given time if multiple requests are being simultaneously handled. Previous controllers, such as that described by Haben et al. in U.S. Pat. No. 4,229,624 have used logic circuitry operating in parallel and in two stages. However, it is believed that no prior controller has combined this feature with a pipelined controller operating under a common logic command circuitry to simultaneously process two requests.

The controller of this invention not only can operate with minimum delay and operate at a high throughput rate, but it also provides additional flexibility. As described previously, the port address table 84 provides for dynamic allocation of ports without the need to update the destination tables in all the requesting devices connected to the ports. Furthermore, different interconnection routes may be chosen over the different columns. If for some reason a column becomes inoperable, the column activity table 94 or the column address generator 98 may be programmed so that the failed column is subsequently avoided. The column address generator 98 may also intelligently choose a column for interconnection based upon other system considerations.

Having thus described our invention, what we claim as new, and desire to secure by Letters Patent is:

1. A controller for a physical switching array for connecting, resulting from a first type request, source data lines requesting connection to a requested destination data line and for disconnecting, resulting from a second type request, a source data line from its connected data line, comprising:
   means for supplying a connection request for a connection to be changed across a physical switching array of cross-points, said connection request not being necessarily honored;
   first means for receiving said request and comprising separate means, operating in parallel, for providing intermediate information on (1) whether said request is of said first or of second type and (2) a present status of said switching array;
   second means for receiving and processing said intermediate information from said first means and generating control signals for said switching array; and
   logic circuitry for controlling said second means as it processes a first request and for simultaneously controlling said first means as it operates on a later accepted second request, whereby said control signals cause said switching array to connect said source data line to the requested destination data line or to disconnect said source data line from its connected data line.

2. A controller, as recited in claim 1, further comprising a connection table for current connectivity information of said data lines and wherein said first means comprises means for fetching a request from said supplying means and determining from said connection table if said destination line is currently used and wherein said logic circuitry reads said request to determine the type of said request and controls said second means according to said type and said availability and wherein said second means includes means for executing said request and for updating said connection table.

3. A controller, as recited in claim 2, wherein said supplying means comprises ports connected to each of said data lines for recognizing said request and directing said request to said first means.

4. A controller, as recited in claim 3, wherein said switching array is a one-sided switching array comprising rows connected to said data lines, internal columns and cross-points therebetween, and wherein said second means further comprises a table for current usage of said columns and means for selecting one of said columns indicated by said current usage table to not be currently used, and wherein said second means supplies the addresses of two cross-points.

5. A controller, as recited in claim 4, wherein the combination of said first and second means further comprises means for returning a message to said source data line.

6. A controller, as recited in claim 5, wherein said first means further comprises means for converting a requested logical data line to a physical data line and said logic circuitry can control said converting means to vary said conversion process.

7. A controller, as recited in claim 6, further comprising a marker receiving the output of said second means for controlling control inputs to said switching array.

8. A controller, as recited in claim 7, wherein said logic circuitry controls the operation of said first means in four sequential steps and controls the operation of said second means in four sequential steps.

9. A controller, as recited in claim 1, wherein said present status is a present connection status of said switching array.

10. A controller, as recited in claim 1, wherein said logic circuitry is a clocked logic circuit having separate cycles, said first means receives said first and second requests in different cycles and during one of said cycles said first means operates on said second request and said second means processes said first request.

* * * * *